3,136,751
CATIONIC THIAZOLE DYES AND PROCESS FOR
MANUFACTURING THE SAME
Masao Iizuka, Kanagawa-ku, Yokohama, and Masao
Yamamoto, Hodogaya-ku, Yokohama, Japan, assignors
to Hodogaya Kagaku Kogyo Kabushiki Kaisha
No Drawing. Filed Oct. 13, 1961, Ser. No. 144,826
Claims priority, application Japan Oct. 18, 1960
11 Claims. (Cl. 260—158)

The present invention relates to a new series of useful cationic dyes of the general formula

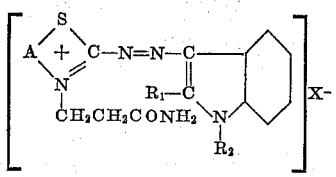

and a process for manufacturing the same. In the above formula A represents a substituted or not-substituted, olefinically unsaturated divalent radical as found in alkene or substituted alkene radical such as, for example, ethene, propene, butene, halogenated alkene, nitroalkene or cyanoalkene, in which one of the two carbon atoms standing with a double bond between them is connected with the positively charged nitrogen and the other one with the sulfur shown in the left heterocyclic ring of the general formula, or a not-substituted or substituted aromatic radical such as, for example, phenyl, alkylphenyl, alkoxyphenyl, halogenated phenyl, etc., in which one of a pair of carbon atoms adjoining in phenyl radical is connected with said sort of positively charged nitrogen and the other with said sort of sulfur, $R_1$ stands for an aliphatic or aromatic radical and $R_2$ for hydrogen atom, an aliphatic or aromatic radical, while X means an anion.

The dyes of the present invention are quite excellent in respect of their enabling various fibers made from polyacrylonitriles or copolymers thereof to be conferred with very nice tones of color.

Speaking of their peculiarity in chemical structure, the dyes of the present invention are invariably furnished, as illustrated in the above general formula, with a β-carbamoylethyl radical as a substitutional group attaching to the tertiary nitrogen in thiazole ring.

The process of manufacturing quarternary ammonium cation dyes by the reaction of various alkylating reagents as, for example, halogenated alkyls, halogenated aralkyls, dialkylsulfates, alkylbenzenesulfates on the thiazole nitrogen of thiazole ring containing azo-dyes as well as the application of thereby manufactured cationic dyes to dyeing various fibers made from polyacrylonitriles and copolymers thereof are in themselves well known. The present basic monoazo-dyes of the above general formula, however, are entirely different in chemical structure from said sorts of known dyes. Thus, the new cationic dyes according to the present invention are of great value, being of phenomenal excellency as compared with the known dyes in respects of various items desired in practical dyeing as, for example, solubility in water, level dyeing, dyeing velocity, fastness against sunlight, washing, rubbing and etc. Moreover, the present dyes are particularly worthy of distinction from known dyes in that decrease in molecular weight scarcely causes them to be correspondingly reduced in the solubility in water as well as in that articles made of polyacrylonitriles or copolymers thereof can be dyed with them at a moderate velocity of dyeing irrespective of the great affinity to them of these high polymers, these merits enabling the present dyes to be completely freed from the tendency of giving rise to uneven dyeing experienced with known dyes.

It is not impossible to prepared the present sorts of dyes by the generally employed sort of quaternarization reaction. Thus, on making, for instance, a tertiary amine compound of thiazole type react on β-bromopropionic acid amide, a dye of said kind can be obtained according to the following reaction scheme:

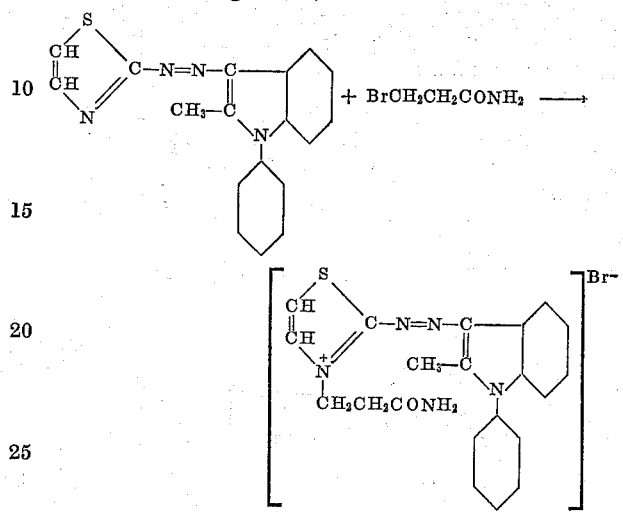

This method of quarternarization, however, can not be looked upon as a manufacturing means of practical availability because of its taking too long a time with a poor yield of the product.

The inventors concerned now discovered a new method which enables said novel sorts of basic monoazo-dyes to be prepared on greatly improved terms not only in its technical aspect but also in the economical view point. This invented process comprises letting acrylic acid amide directly on a tertiary amino compound of thiazole type, either subjected to no further processing or dissolved in a proper solvent, in the presence of an organic or inorganic acid capable of working as a proton-donor so as to produce a quarternary basic monoazo-dye of the aforementioned general formula. The reaction concerned is considered to proceed according to the following scheme:

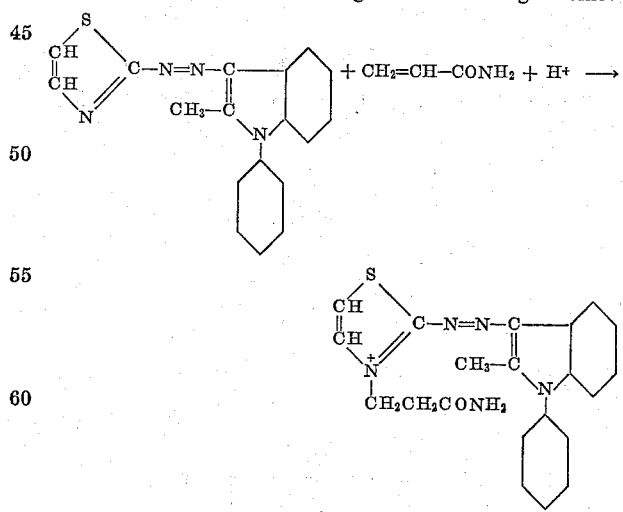

Because no reaction has ever been disclosed which allows a catonic dye to be produced by direct reaction of such an unsaturated compound as acrylic acid amide on a tertiary amine as molecular constituent of azo-dyes, the manufacturing process of the present invention should be looked upon as novel.

The solvent employed as it is desired in carrying out the present reaction is preferably to be capable of effectively dissolving the tertiary amino compound used as raw material. The preferable solvent is exemplified by alcohols such as ethanol, butanol and ethyleneglycol, ethers such as tetrahydrofuran and dioxan, dimethylformamide, methylethylketone and diethylketone, while hydrocarbons of benzene series and suitable derivatives therefor such as benzene, toluene, nitrobenzene and chlorobenzene are also available.

As the proton-donating acid, besides inorganic acids such as hydrochloric acid, sulfuric acid, phosphoric acid, hydrobromic acid and hydroiodic acid, organic acids such as glacial acetic acid, formic acid, benzenesulfonic acid and toluenesulfonic acid can also be advantageously employed.

Though the present reaction is in itself a sort of exothermic reaction, heating is necessary in starting the reaction, carrying out the reaction at a thus elevated temperature being preferable.

In the following, the present invention is explained by examples, the word "parts" in these examples meaning parts in weight.

*Example 1*

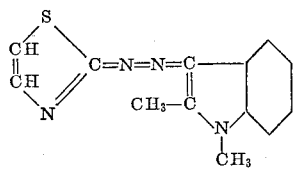

of 25.6 parts and acrylic acid amide of 35.5 parts are dissolved in 200 parts of glacial acetic acid. The mixture is then added with 12 parts of 35% hydrochloric acid, heated under thorough stirring to 95° C. and kept at this temperature for 1 hour in reaction. After completion of the reaction, a great portion of the glacial acetic acid is recovered, the content of the reaction vessel being then dissolved in 5000 parts of water added. The solution is added with 13.6 parts of zinc chloride and further with sodium chloride of an amount corresponding to 12% of total weight of the mixture so as to cause the salt of dye as reaction product to precipitate. Separating by filtration and drying the precipitate, a dye is obtained which dissolves readily in water and develops an orange color. It dyes polyacrylonitrile fibers an orange color with an excellent fastness and level dyeing property.

*Example 2*

By working analogously to Example 1 but using 30.4 parts of

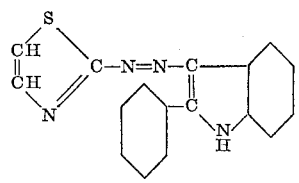

instead of

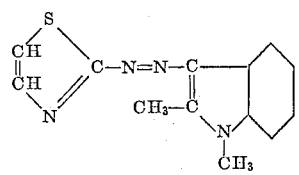

a dye is obtained which is excellent in fastness, has a level dyeing property and dyes polyacryloniltrile fibers a pure red color.

*Example 3*

Working analogously to Example 1 but using 37.6 parts of

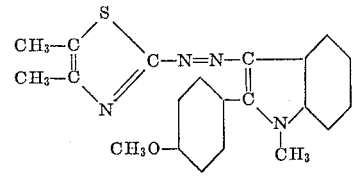

instead of

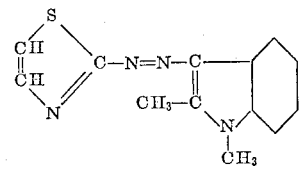

and 15 parts of 48% hydrobromic acid instead of the 35% hydrochloric acid, a dye is obtained which has an excellent fastness and level dyeing property and dyes polyacrylonitrile fibers bluish red.

*Example 4*

A compound

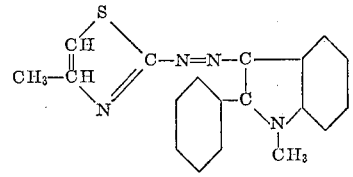

amounting to 33.2 parts and 28.4 parts of acrylic acid amide are completely dissolved in 180 parts of 80% formic acid and subjected under stirring for 2 hours to reaction. After completion of reaction, the whole solution is poured into 1000 parts of water. When the mixture become clear, it is added first with 13.6 parts of zinc chloride and then with sodium chloride amounting to 10% of total weight of the solution so that the salt of dye thus produced may be precipitated. The dye obtained by filtration and drying dissolves very readily in water, developing a bluish red color. It dyes polyacrylonitrile fibers a slightly bluish red color having an excellent fastness and level dyeing property.

*Example 5*

Working analogously to Example 4 except using 31.8 parts of

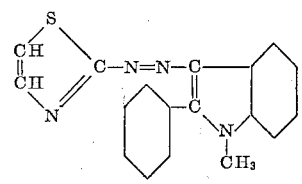

instead of

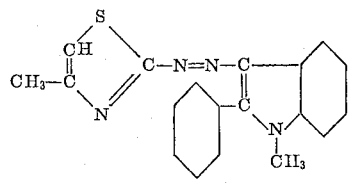

a dye is obtained which dyes polyacrylonitrile yellowish red and possesses an excellent fastness and level dyeing property.

Example 6

Working analogously to Example 4 but using 34.8 parts of

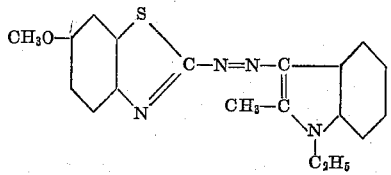

instead of

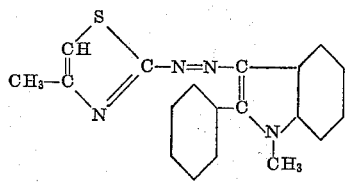

a dye is obtained which dyes polyacrylonitrile fibers bluish red and has an excellent fastness and level dyeing property.

Example 7

A compound

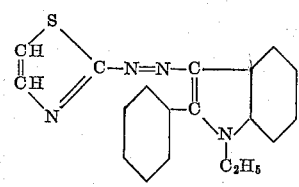

of 33.2 parts and acrylic acid amide of 35.5 parts are completely dissolved in 360 parts of glacial acetic acid and added with 36.6 parts of p-toluene-sulfonic acid (containing 4 molecules of water of crystallization). The mixture is heated under thorough stirring to 95° C. and kept at this temperature for 45–6 till the completion of reaction. After recovering a greater portion of the glacial acetic acid under reduced pressure, the content of reaction vessel is dissolved in 1000 parts of water added. The resulting solution is added with 13.6 parts of zinc chloride and further with sodium chloride amounting to 12% of total weight of the solution so as to cause the salt of dye as final product to come out of the solution. The dye thus obtained dissolves readily in water, developing a red color, and dyes polyacrylonitrile fibers a red color somewhat tinged with yellow which is level dyed and excellent in fastness.

Example 8

Working analogously to Example 7 but employing 29 parts of

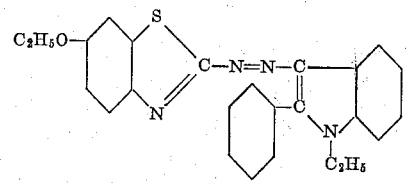

instead of

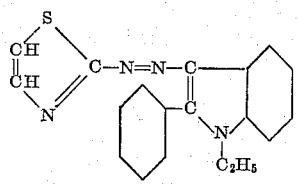

a dye is obtained which dyes polyacrylonitrile fibers reddish violet and possesses an excellent fastness and level dyeing property.

Example 9

Working analogously to Example 7 but employing 29.7 parts of

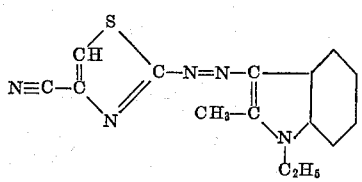

instead of

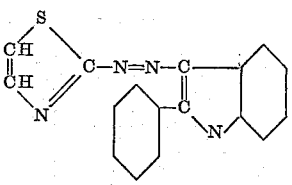

and a mixed solvent comprising 50 parts of ethanol and 250 parts of butanol, a dye is obtained which dyes polyacrylonitrile fibers red and has an excellent fastness and level dyeing property.

Example 10

A compound

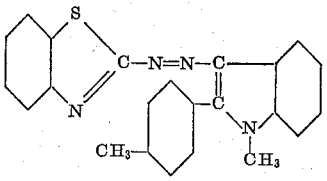

of 38 parts and acrylic acid amide of 35.5 parts are dissolved in 400 parts of nitrobenzene and added with 11 parts of concentrated sulfuric acid. The mixture is then heated under thorough agitation till it acquires a temperature of 100° C. at which the mixture is kept in reaction for about 2 hours. After recovering a greater portion of the nitrobenzene under reduced pressure, 1000 parts of water is added to cause the content of reaction vessel to be dissolved. Insoluble matters being removed by filtration, if necessary, the solution is then added with 13.6 parts of zinc chloride and further with sodium chloride amounting to 10% of total weight of the solution, causing the salt of dye produced to precipitate. The dye thus obtained dissolves readily in water, developing a bluish red color and dyes polyacrylonitrile fibers a bluish red color possessing an excellent fastness and level dyeing property.

Example 11

Working analogously to Example 10 but using 38 parts of

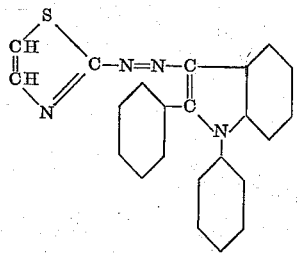

instead of

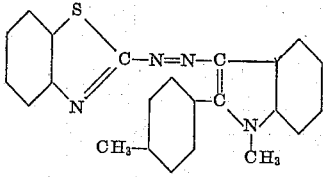

Example 12

A compound

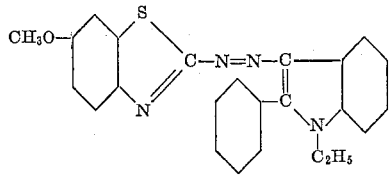

of 41 parts and acrylic acid amide of 35.5 parts are dissolved in 300 parts of ethyleneglycol and added with 19.2 parts of 48% hydrobromic acid. The mixture is heated under thorough stirring to 100° C. and kept for 1 hour at this temperature in reaction. The mixture is then entirely poured into 1500 parts of water to give rise to a clear solution. The solution is added first with 13.6 parts of zinc chloride; and thus produced salt of dye is then precipitated by the addition of sodium chloride in an amount corresponding to 10% of total weight of the solution. The dye here obtained dissolves readily in water, producing a bluish red solution, and has an ability of dyeing polyacrylonitrile fibers a strongly red color of excellent fastness and level dyeing property.

Example 13

Working analogously to Example 12 but employing 31.3 parts of

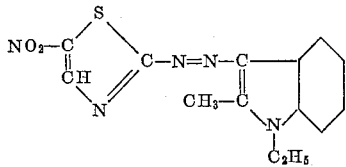

instead of

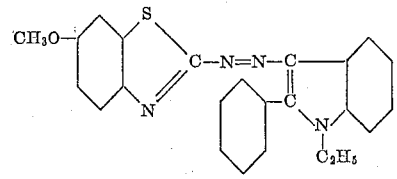

a dye is obtained which dyes polyacrylonitrile fibers bluish red and has an excellent fastness and level dyeing property.

Example 14

Working analogously to Example 12 but using 34.8 parts of

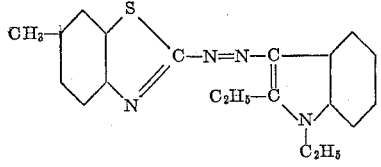

instead of

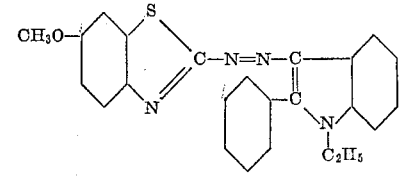

and 28 parts of benzenesulfonic acid instead of the hydrobromic acid, a dye is obtained which dyes polyacrylonitrile fibers bluish red and has excellent fastness and level dyeing property.

We claim:

1. Basic monoazo dyes having the following general formula:

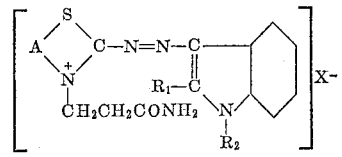

wherein
A is an olefinically unsaturated divalent radical, said olefinically unsaturated divalent radical selected from the group consisting of ethene, propene, chloroalkene, nitroalkene, cyanoalkene, phenyl, lower alkylphenyl, lower alkoxyphenyl and chlorophenyl radicals, said olefinically unsaturated divalent radical having a first of two doubly bonded carbon atoms bonded to $\overset{+}{N}$ and the second of said two doubly bonded carbon atoms bonded to S of the thiazole ring in the above general formula,
$R_1$ is a radical selected from the group consisting of lower alkyl and phenyl radicals,
$R_2$ is a radical selected from the group consisting of a hydrogen atom, lower aliphatic and phenyl radicals, and
X is an anion.

2. The basic monoazo-dye represented by

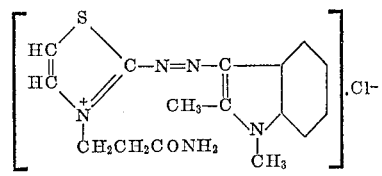

3. The basic monoazo-dye represented by

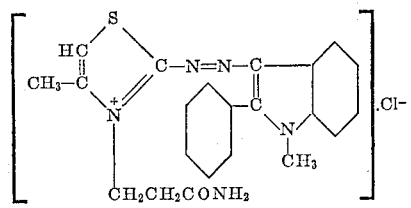

4. The basic monoazo-dye represented by

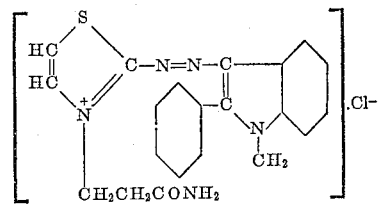

5. The basic monoazo-dye represented by

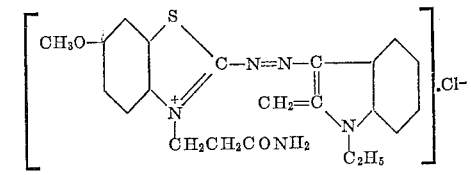

6. The basic monoazo-dye represented by

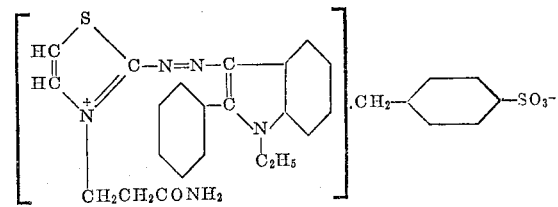

7. The basic monoazo-dye represented by

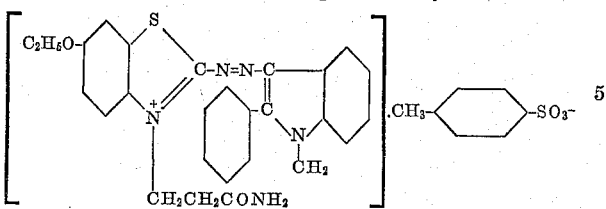

8. The basic monoazo-dyes represented by

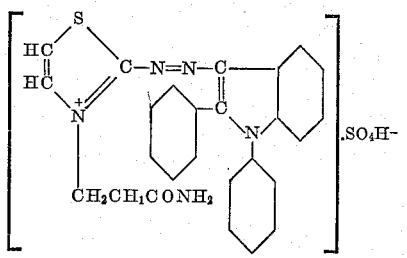

9. The basic monoazo-dye represented by

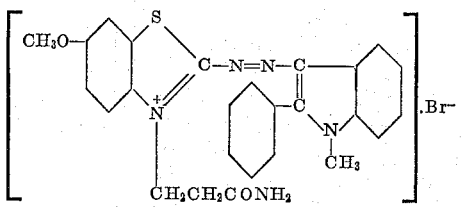

10. The basic monoazo-dye represented by

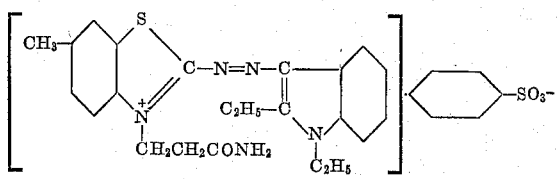

11. A process for manufacturing basic monoazo-dyes which comprises directly reacting acrylic acid amide on a compound having the following general formula

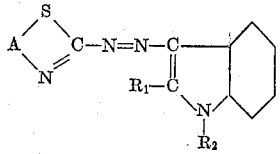

wherein A is a divalent olefinically unsaturated radical, said divalent olefinically unsaturated radical being one selected from the group consisting of ethene, propene, chloroalkene, nitroalkene, cyanoalkene, phenyl, lower alkylphenyl, lower alkoxyphenyl and chlorophenyl radicals, said divalent olefinically unsaturated radical having a first of two doubly bonded carbon atoms bonded to the nitrogen and the second of said doubly bonded carbon atoms bonded to the sulfur of the thiazole ring in the above general formula, $R_1$ is a radical selected from the group consisting of alkyl and phenyl, and $R_2$ is a radical selected from the group consisting of a hydrogen atom, lower alkyl and phenyl, the reaction being carried out in a suitable solvent in the presence of a proton donor selected from the group consisting of organic and inorganic acids.

References Cited in the file of this patent

UNITED STATES PATENTS 2,893,816    Tsang et al. _____ July 7, 1959

OTHER REFERENCES

Hickenbottom: "Reactions of Organic Comps." 1948, 2nd Ed., pages 24 and 25, Longmans, Green and Co.